United States Patent [19]

Villata et al.

[11] Patent Number: 5,647,468
[45] Date of Patent: Jul. 15, 1997

[54] CLUTCH MECHANISM, NOTABLY FOR A MOTOR VEHICLE

[75] Inventors: Gino Villata, Buttigliera d'Asti, Italy; Jean-Pierre Giroire, St. Germain en Laye, France

[73] Assignee: Valeo, Paris, France

[21] Appl. No.: 553,536

[22] PCT Filed: Mar. 29, 1995

[86] PCT No.: PCT/FR95/00389

§ 371 Date: Nov. 30, 1995

§ 102(e) Date: Nov. 30, 1995

[87] PCT Pub. No.: WO95/27152

PCT Pub. Date: Oct. 12, 1995

[30] Foreign Application Priority Data

Mar. 30, 1994 [FR] France .................. 94 03747

[51] Int. Cl.$^6$ ............................. F16D 13/71
[52] U.S. Cl. ................. 192/89.23; 192/109 R
[58] Field of Search ............... 192/70.18, 70.27, 192/70.28, 89.23, 109 R, 109 A

[56] References Cited

U.S. PATENT DOCUMENTS

| 2,770,341 | 11/1956 | Wobrock | 192/89.23 X |
| 3,939,951 | 2/1976 | Sink et al. | 192/89.23 |
| 4,122,929 | 10/1978 | Maucher et al. | 192/70.18 |
| 4,690,259 | 9/1987 | Naudin | 192/89.23 X |

FOREIGN PATENT DOCUMENTS

| 0237144 | 9/1987 | European Pat. Off. . |
| 2031964 | 11/1970 | France . |
| 2547001 | 12/1984 | France . |
| 2239477 | 2/1974 | Germany . |
| 2607939 | 9/1977 | Germany . |
| 4415482 | 11/1994 | Germany . |

*Primary Examiner*—Richard M. Lorence
*Attorney, Agent, or Firm*—Longacre & White

[57] ABSTRACT

The clutch mechanism includes a cover (1), a diaphragm (2), a pressure plate (3) coupled to the cover (1) by tongues (8) and return hooks (5) coupling the diaphragm (2) to the pressure plate (3). At least some of the hooks (5) are extended outwards in order to form a stop (7) suitable for coming into abutment against a counter-stop (6) formed by one of the edges of a mounting hole (9) in the cover (1).

2 Claims, 3 Drawing Sheets

CLUTCH MECHANISM, NOTABLY FOR A MOTOR VEHICLE

This application is entitled to the benefits of international application, PCT/FR95/00389, filed Mar. 29, 1995 as prescribed by 35 U.S.C. 365.

The present invention concerns diaphragm clutch mechanisms and return hooks as described for example in the document FR-A-2 031 964.

Such a mechanism forms a unit assembly and includes a cover suitable for being attached to the reaction plate of the clutch, a diaphragm mounted on the cover by pivoting means pivotally fixing the diaphragm to the cover, a pressure plate fixed to the cover with respect to rotation whilst being mounted so as to be axially movable with respect to the latter by means of tangential elastic tongues, return hooks for coupling the diaphragm to the pressure plate by gripping the outer periphery of the diaphragm between the said hooks and a support boss, which the pressure plate has for supporting the diaphragm, fixing components serving to fix the tangential tongues and return hooks with lugs, which the pressure plate has radially projecting at its outer periphery.

Usually assembly is effected by fixing the tangential tongues to a radial flange on the cover by means of first fixing components such as rivets or screws, and then by mounting the hook on the tongues and finally slipping second fixing components into holes, which the tongues, hooks and lugs of the pressure plate have for this purpose.

As a result the cover, which has a base, has mounting holes affecting the said base in order to mount the hooks transversely and axially slip in the fixing components.

These holes are delimited by a rear edge adjacent to the base of the cover, a front edge furthest away axially from the base of the cover and two lateral edges connecting together the rear and front edges. The rear edge therefore affects the base of the cover.

In practice the diaphragm bears on the cover in order to act on the pressure plate so as to push the latter away from the cover.

When the mechanism is in the storage position, not yet mounted on the reaction plate, the tongues are highly stressed, so that their elastic limit may be exceeded and they may be damaged.

This is all the more true since the mechanism may be inadvertently dropped during faulty handling, the pressure plate then moving because of its inertia.

On the other hand, once mounted on the reaction plate, the tongues are less curved.

To mitigate this drawback arrangements may be devised which have recourse to at least one lug on the pressure plate coming to bear against one of the edges of an opening provided in the cover.

This arrangement requires the pressure plate to be modified. As a variant the tongues can be extended so that they come to bear against a counter-stop provided on the cover.

This requires modification of the tongues.

As a variant the fixing component can be extended so that it comes to bear against a stop formed on the cover.

This requires modification of the fixing component.

In general terms it is desirable, for economic reasons, not to destandardise the pressure plate, tongues and fixing components, all mass produced.

The object of the present invention is to meet this requirement and to mitigate these drawbacks simply and economically, whilst modifying the clutch mechanism as little as possible.

According to the invention a mechanism of the type indicated above is characterised in that at least some of the return hooks are extended outwards in order to form a stop suitable for coming to bear against an associated counter-stop formed by the front edge or lateral edge concerned of the mounting holes.

In this way a maximum number of components of the mechanism are retained, only the return hook being modified, and this in a simple and economical manner.

In addition use is made of the mounting holes and it is possible to fit or not to fit such a stop hook.

In addition, even if in the storage position the diaphragm is in abutment against the base of the cover, the tongues are protected by preventing any movement of the pressure plate, for example during falls.

The following description illustrates the invention with regard to the accompanying drawings in which.

Figure 1:
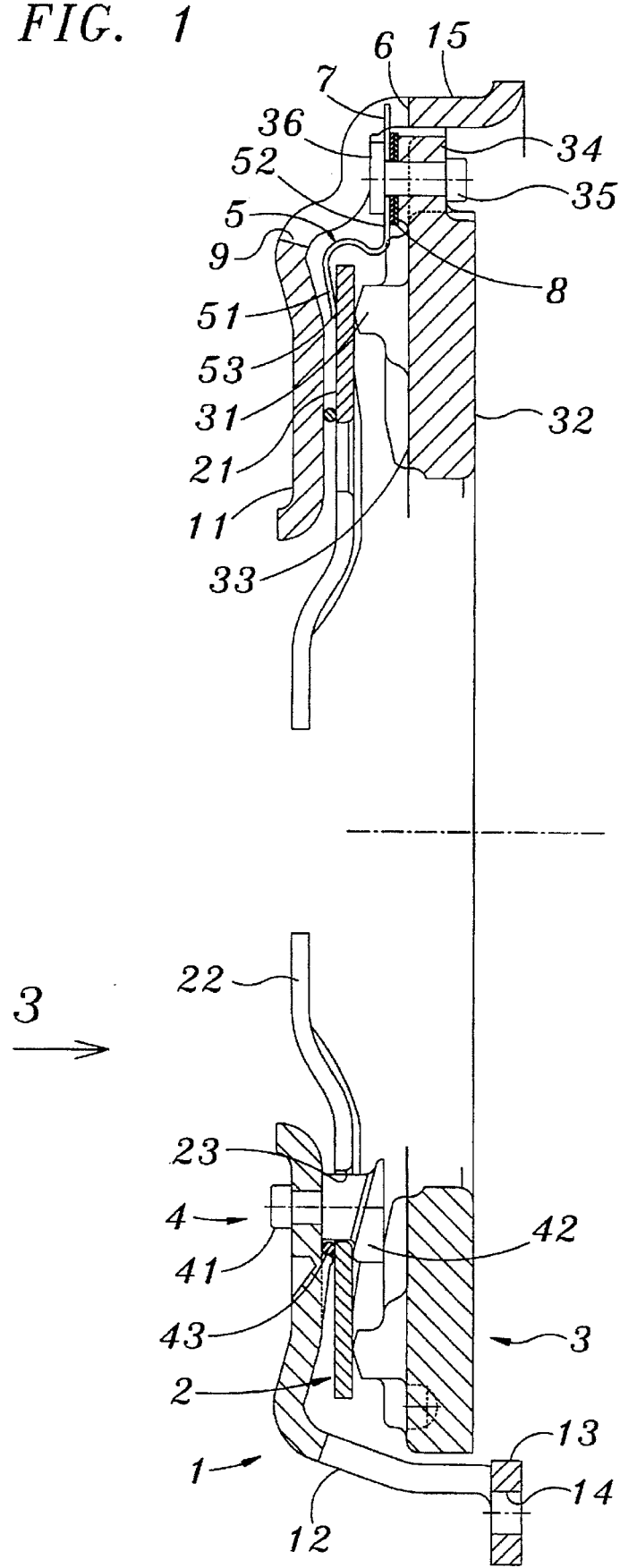
FIG. 1 is a view in axial section of a mechanism according to the invention.

In these figures a clutch mechanism with a diaphragm and return hooks is illustrated, intended for fitting to a motor vehicle.

This mechanism forms a unit assembly and includes annular parts, namely a cover 1, in this case made from pressed sheet metal, a pressure plate 3, usually cast iron, and a diaphragm 2.

It also includes tangential elastic tongues 8, fixing components 35, 85 and return hooks 5 described below.

Figure 2:
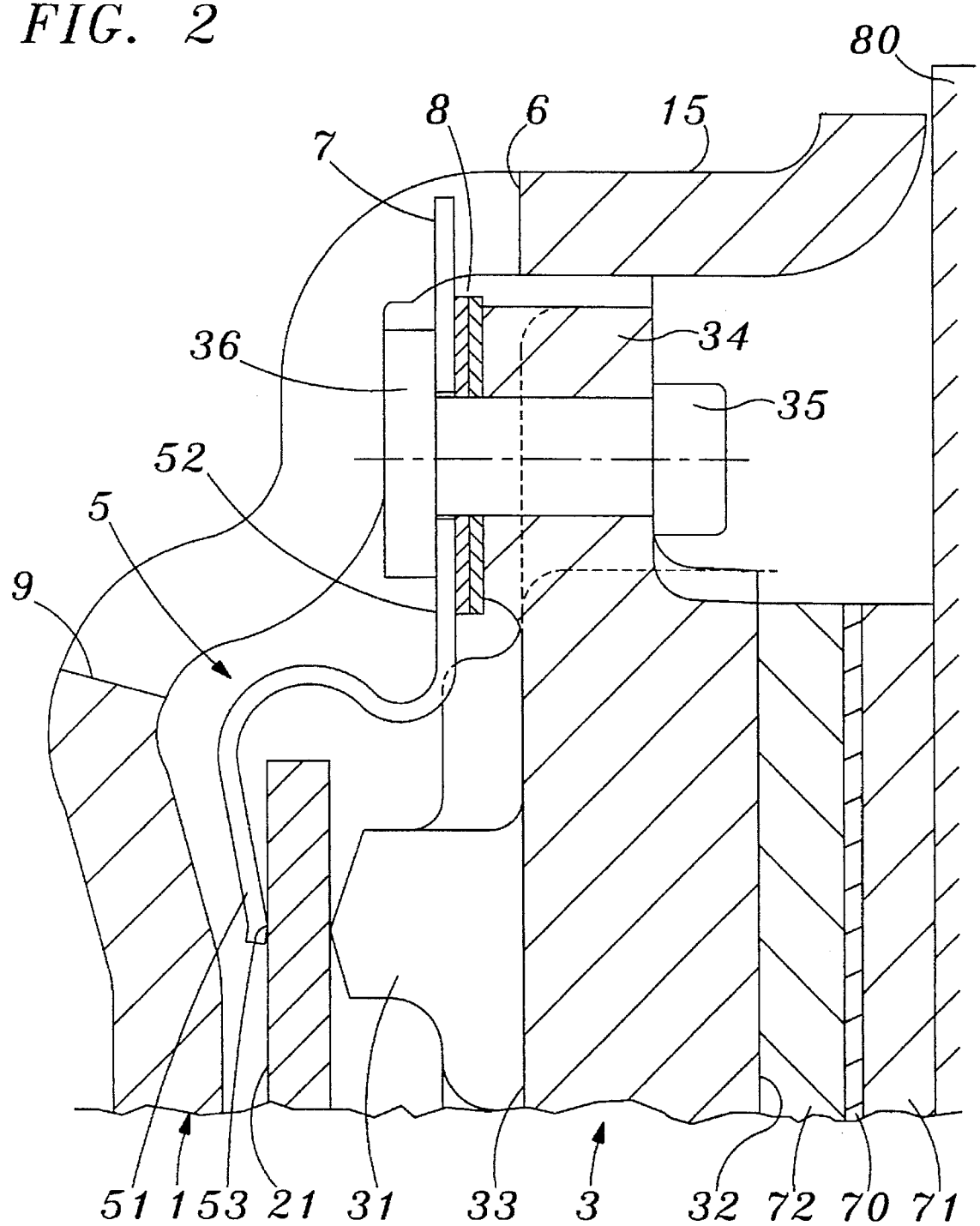
FIG. 2 is a partial view, to a larger scale, of a part of the mechanism in the top part of FIG. 1.

This mechanism (FIG. 2) is designed to be attached by its cover 1, in this case in the form of a hollow dish with a base 11 with a central hole, to a reaction plate 80 (depicted diagrammatically) with the interposition of a friction disc 70 fixedly carrying friction linings 72, 71, optionally in sections, mounted on each side thereof.

The reaction plate, optionally in two parts, is designed to be fixed with respect to rotation to the crankshaft of the vehicle engine, whilst the disc 70 is designed to be fixed with respect to rotation, by means of a hub, to the gearbox input shaft.

The diaphragm 2 is mounted on the cover 1 by pivoting means 4 pivotally fixing the diaphragm 2 to the cover 1.

The pressure plate 3 is fixed with respect to rotation to the cover 1 whilst being mounted so as to be axially movable with respect thereto, in a manner known per se, by means of tangential elastic tongues 8.

Return hooks 5 are provided to couple the diaphragm 2 to the pressure plate 3 by gripping the outer periphery of the diaphragm 2, in the form of a Belleville washer 21, between the said hooks 5 and a support boss 31, which the pressure plate 3 has at its outer periphery for supporting the diaphragm 2.

Fixing components 35 are provided for fixing the tongues 8 and the return hooks 5 to lugs 34, which the pressure plate 3 has radially projecting at its outer periphery.

More precisely the cover 1 has, in addition to the aforesaid base 11, a radial flange 13 for fixing it to the reaction plate 80, and an annular skirt 12, with a principal part of axial orientation overall, connecting the fixing flange 13 to the base 11.

This flange 13 is divided into fixing areas (FIG. 3), which have holes 14 for mounting fixing components (not visible), such as screws or rivets, for fixing the cover 1 and the mechanism to the plate 80.

The base 11 of the cover 1 carries, fixed by riveting, a plurality of studs 41 having a head 42 and carrying an annular ring 43.

The diaphragm 1 has, in addition to its peripheral part 21, a central part divided into radial fingers 22 by slots broadening out at the area where the fingers 22 are rooted in the Belleville washer 21 to form broadened orifices 23 through which the central shaft of the studs 41 passes. The studs 41 form, with the ring 43, means pivotally fixing the diaphragm 2 to the cover 1. These means are in this case of small size axially, which assists a reduction in the axial size of the holes 9 mounting the hooks 5.

In this case the head 42, with a rounded end, offers a secondary support for the diaphragm 2 opposite the ring 43 forming a primary support. As a variant the ring 43 can be replaced by a pressing formed in the base 11 of the cover. The studs 41 can be replaced by lugs formed directly from the base 11 of the cover 1, by cutting out and bending, and passing axially through the orifices 23 so as to have a free end folded radially in the direction opposite to the axis of the assembly with the interposition of an annulus, offering a secondary support to the diaphragm, between the said folded end and the diaphragm.

The heads of the studs can be cylindrical with the interposition, between them and the diaphragm 2, of a ring forming the secondary support.

In general terms the diaphragm is pivotally mounted between its primary 43 and secondary 42 supports belonging to the pivoting means 4.

When the clutch is engaged—friction linings 72, 71 clamped between the front friction face 32 of the pressure plate 3 and the reaction plate 80—the diaphragm 2 bears through the inner peripheral part of its Belleville washer 21 on the primary support 43, and through the outer periphery of its Belleville washer 21 on the support boss 31 of the pressure plate 3. This boss 31, carried by the rear face 33 of the plate 3, turned towards the base 11, is in this case divided into annular segments.

To disengage the clutch (and therefore to release the linings 72, 71), in a manner known per se, pressure is exerted by pushing by means of a clutch release bearing (not shown) on the inner end of the fingers 22 of the diaphragm 2 in order to cause the latter to pivot.

During this operation the diaphragm bears on the secondary support 42 and the hooks 5 return the pressure plate 3 in the direction of the base 11 of the cover because of the fact that the diaphragm is here gripped elastically between the said hooks 5 and the boss 31.

Here the skirt 12 surrounds the pressure plate 3 and the tongues 8 participate in the return of the plate 3 in the direction of the cover.

This skirt is stepped radially in order to have surfaces 15 at the outer periphery of the cover.

Figure 3:
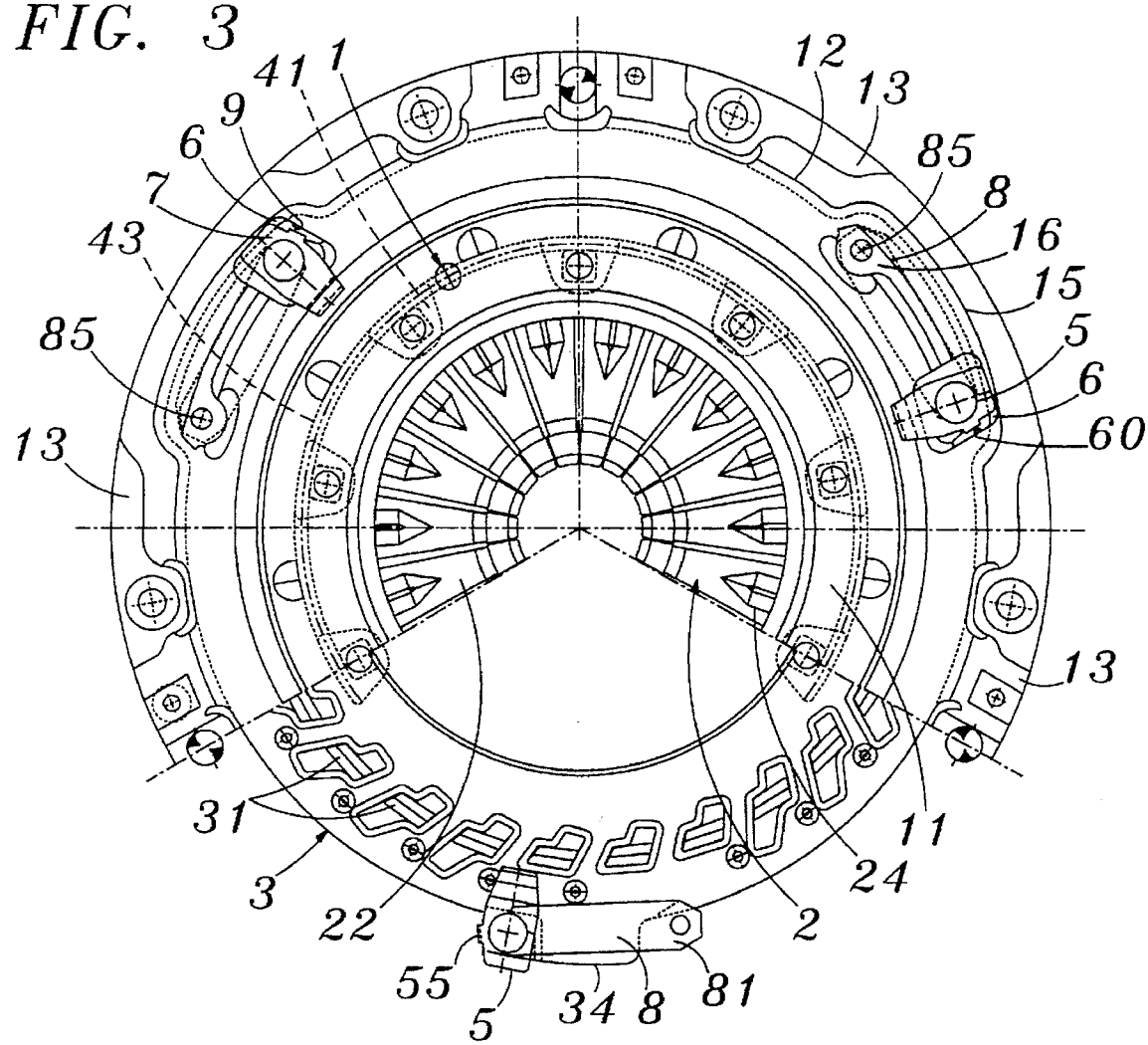
FIG. 3 is a view in the direction of the arrow 3 in FIG. 1 with local cutaways to show the pressure plate.

These surfaces 15, of axial orientation, alternate circumferentially with the fixing surfaces of the flange 13 (FIG. 3). The surfaces 15 surround the lugs 34 of the plate 3. These lugs 34 are extended circumferentially (FIG. 3).

For information, it should be stated that these tongues 8, in this case metallic, extend overall tangentially to a circumference of the assembly (FIG. 3) and are fixed at one of their ends by the fixing components 35 to the radial lugs 34 and at their other end by second fixing components 85 to radial lugs 16 on the cover 11.

These lugs 16 are offset axially with respect to the base 11 in the direction of the flange 13. To this end (FIG. 3) these lugs 16 are delimited by the openings affecting the skirt 12.

In this case the tongues 8 are mounted in pairs and the fixing components 35, 85 consist of rivets.

Three sets of pairs of tongues and three hooks are provided, here distributed at 120° with respect to each other.

Naturally this number, like the number of hooks, is not limitative and depends on the applications.

For mounting the hooks 5 and fixing components 35, passing through the hooks 5—the tongues 8 and the lugs 34 by means of holes which the said parts (FIG. 2) have for this purpose, the cover 1 has mounting holes 9 at the rate of one hole per hooks 5, pair of tongues 8 and component 35.

These holes 9 are formed on the base 11 and the rounded area of connection of the base 11 to its skirt 12. These holes 9 therefore have a front edge 6 furthest away axially with respect to the base 11 of the cover formed on, according to one characteristic, the surfaces 15 of the skirt 12 in this case provided with ventilation orifices.

They are also delimited by a rear edge adjacent to the base 11 and two lateral edges connecting together the front and rear edges. The rear edge therefore is formed on the base 11.

Figure 4:
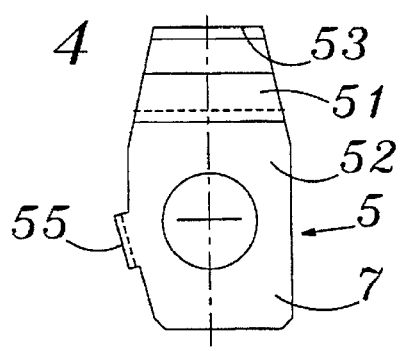
FIG. 4 is a plan view of a hook according to the invention.

The return hooks 5, in this case metallic, have a base plate 52, of transverse orientation, extended radially inwards by a curved part 51 passing round the diaphragm (the outer periphery thereof) in order to offer a support pad 53 opposite the pointed boss 31. The part 51, trapezoidal in shape (FIG. 4), is therefore elastic, which allows gripping, at one point, of the diaphragm between the pad 53 and boss 31. Here the head 36 of the rivets 35 bears on the base plate 52 in order to grip the tongues 8 between the lug 34 and base plate 52. As a variant the components 35 can consist of bolts or pins, whose shaft is forcibly mounted in a blind hole, which the lugs 34 then have.

When the clutch is engaged in the new condition, with new linings 71, 72, the diaphragm, tapered in shape in the free state, extends transversely overall.

More precisely, its Belleville washer part 21 and the inner end of its fingers 22, in this case curved in shape, extend transversely.

On the other hand in the free state—also referred to as the storage position—(with the mechanism not mounted on the plate 80), the diaphragm tilts and pushes the plate 3 in the direction opposite to the base 11, that is to say outwards. The tongues 8 then curve.

If no steps are taken in certain cases, the elastic limit of the tongues may be exceeded, notably when the mechanism is dropped, because of the inertia of the reaction plate.

To prevent this, according to the invention, at least one hook 5 is extended radially outwards in order to form a stop 7 able to come into abutment against an associated counter-stop 6 formed by the front edge 6 or the relevant lateral edge 60 of the mounting holes 9.

In this case the counter-stop 6 is formed axially on the rear edge of the surface 15 and therefore the front edge 6 of the mounting holes. To do this the hook 5 is extended radially outwards.

Here three surfaces 15 are provided at the rate of one per hook and pair of tongues, whilst being regularly distributed circumferentially.

Naturally this depends on the applications.

It is therefore the base plate 52, which is extended radially outwards to form the stop 7 and which engages with circumferential clearance in the hole 9 to avoid any friction.

Figure 5:
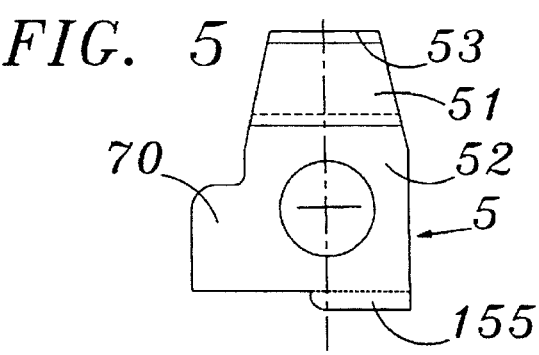
FIG. 5 is a view similar to FIG. 4 for a second embodiment.

The hook 5 has laterally a bent lug 55 formed from its base plate 52 (FIG. 5). This lug, directed axially, is suitable for cooperating with the section of the relevant free end 81 of the tongue 8.

This end 81 has a trapezoidal shape overall.

Thus the hook 5 is immobilised with respect to rotation through cooperation of shapes and there is no risk of its turning.

It will be noted that the position of the lug 55 allows the formation of the stop 7.

Naturally the present invention is not limited to the example embodiment described. In particular the cover can be made of fibre-reinforced plastic.

The clutch can include two pressure plates and therefore two friction discs.

The hole 9 can have another shape, this depending on the depth of the cover 1 in this case entirely surrounding the pressure plate 3 and diaphragm 1.

The diaphragm 1 can have fingers with a curved inner end. These fingers can lie entirely in line with its Belleville washer.

Nevertheless it will be noted that on the one hand the studs 41 with heads 42 and on the other hand the shape of the diaphragm with fingers 22, having an inner periphery offset axially with respect to the outer periphery by means of an inclined region, assist a reduction in the thickness of the mechanism and therefore in the size, notably the axial size, of the mounting holes.

These fingers 22 are ribbed at 24, the said rib extending into the peripheral part 21 of the diaphragm.

In this case these ribs 24 are produced by machine pressing of the fingers 22 in the direction of the plate 3.

Thus the fingers 22 are stiffened and the lifting of the pressure plate is better during the disengagement of the clutch.

As a variant (FIG. 5) the hook can be extended laterally, that is to say circumferentially, to form the stop 70 designed then to cooperate with the counter-stop 60 formed by the lateral edge which is closest to the free end 81 of the tongue or tongues 8. The hook 5 then has radially outwards a folded lug formed from its base plate 52.

This axially folded lug 155 is suitable for cooperating with the relevant section of the tongues 8, in this case the outer longitudinal section of the tongues 8.

Naturally a single tongue can be mounted by lugs 34, this all depends on the applications.

We claim:

1. Diaphragm clutch mechanism, having a cover (1) suitable for being attached to a reaction plate (80) of a clutch, a diaphragm (2) mounted on the cover by pivoting means (4) pivotally fixing the diaphragm to the cover, a pressure plate (3) fixed to the cover (1) with respect to rotation whilst being mounted so as to be axially movable with respect to the cover by means of tangential elastic tongues (8), return hooks (5) for coupling the diaphragm (2) to the pressure plate (3) by gripping the outer periphery (21) of the diaphragm (2) between said hooks (5) and a support boss (31), which the pressure plate (3) has for supporting the diaphragm (2), fixing components (35) serving to fix the tangential tongues (8) and return hooks (5) to lugs (34) which the pressure plate has radially projecting at its outer periphery, in which the cover (1) has a base (11), a skirt surrounding the lugs (34), and mounting holes (9) for mounting return hooks (5) and fixing components (35), said holes (9) formed on the base (11) of the cover, and being delimited by a rear edge adjacent to the base of the cover, a front edge (6) furthest away axially from said base, and two lateral edges (60) connecting together the front (6) and rear edges, characterised in that at least some of the return hooks (5) are extended outwards in order to form a stop (7, 70) suitable for coming into abutment against an associated counter-stop (6, 60) formed by the front edge of the mounting hole (9) formed on a surface (15) on the skirt surrounding the lug of the pressure plate (3), said surface (15) being offset radially with respect to a main part of the skirt (12) and extending to the outer periphery of the cover (1), and in that the hook (5) is extended radially outwards in order to form the stop (7).

2. Mechanism according to claim 1, characterised in that the hook (5) has laterally a lug (55) suitable for cooperating with a section of a free end (81) concerned of the tangential tongue (8).

* * * * *